United States Patent
Hashimoto

(10) Patent No.: US 10,831,680 B2
(45) Date of Patent: Nov. 10, 2020

(54) COMMUNICATION SYSTEM, COMMUNICATION DEVICE, AND COMMUNICATION METHOD FOR CONTROLLING INFORMATION TRANSFER WHEN CONNECTING AN INPUT DEVICE

(71) Applicant: SEIKO EPSON CORPORATION, Tokyo (JP)

(72) Inventor: Hiroyuki Hashimoto, Hara-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/351,003

(22) Filed: Mar. 12, 2019

(65) Prior Publication Data

US 2019/0286578 A1     Sep. 19, 2019

(30) Foreign Application Priority Data

Mar. 13, 2018   (JP) .................................. 2018-045225

(51) Int. Cl.
*G06F 13/20*  (2006.01)
*G06F 3/06*   (2006.01)
*G06F 13/10*  (2006.01)

(52) U.S. Cl.
CPC .............. *G06F 13/10* (2013.01); *G06F 13/20* (2013.01); *G06F 2213/0042* (2013.01)

(58) Field of Classification Search
None
See application file for complete search history.

(56) References Cited

U.S. PATENT DOCUMENTS

2018/0123783 A1*  5/2018  Ko .................... H04L 9/0894

FOREIGN PATENT DOCUMENTS

JP            2006-258833 A       9/2006

* cited by examiner

*Primary Examiner* — Scott C Sun
(74) *Attorney, Agent, or Firm* — Oliff PLC

(57) ABSTRACT

A communication system includes a first communication device and a second communication device communicating with the first communication device. The first communication device includes: a first communication unit receiving, from a first input device, first input information and first information about an attribute of the first input device; and a second communication unit which does not transmit the first information received by the first communication unit to the second communication device but transmits the first input information received by the first communication unit to the second communication device. The second communication device includes: a storage unit storing second information about an attribute of the first input device; a third communication unit receiving the first input information from the first communication device; and a control unit outputting the second information stored in the storage unit and the first input information received by the third communication unit to a processing device.

8 Claims, 7 Drawing Sheets

FIG. 4

| IDENTIFICATION INFORMATION | DESCRIPTOR |
|---|---|
| A | AAA |
| B | BBB |

FIG. 5

| IDENTIFICATION INFORMATION | DESCRIPTOR |
|---|---|
| A | AAA |
| B | BBB |

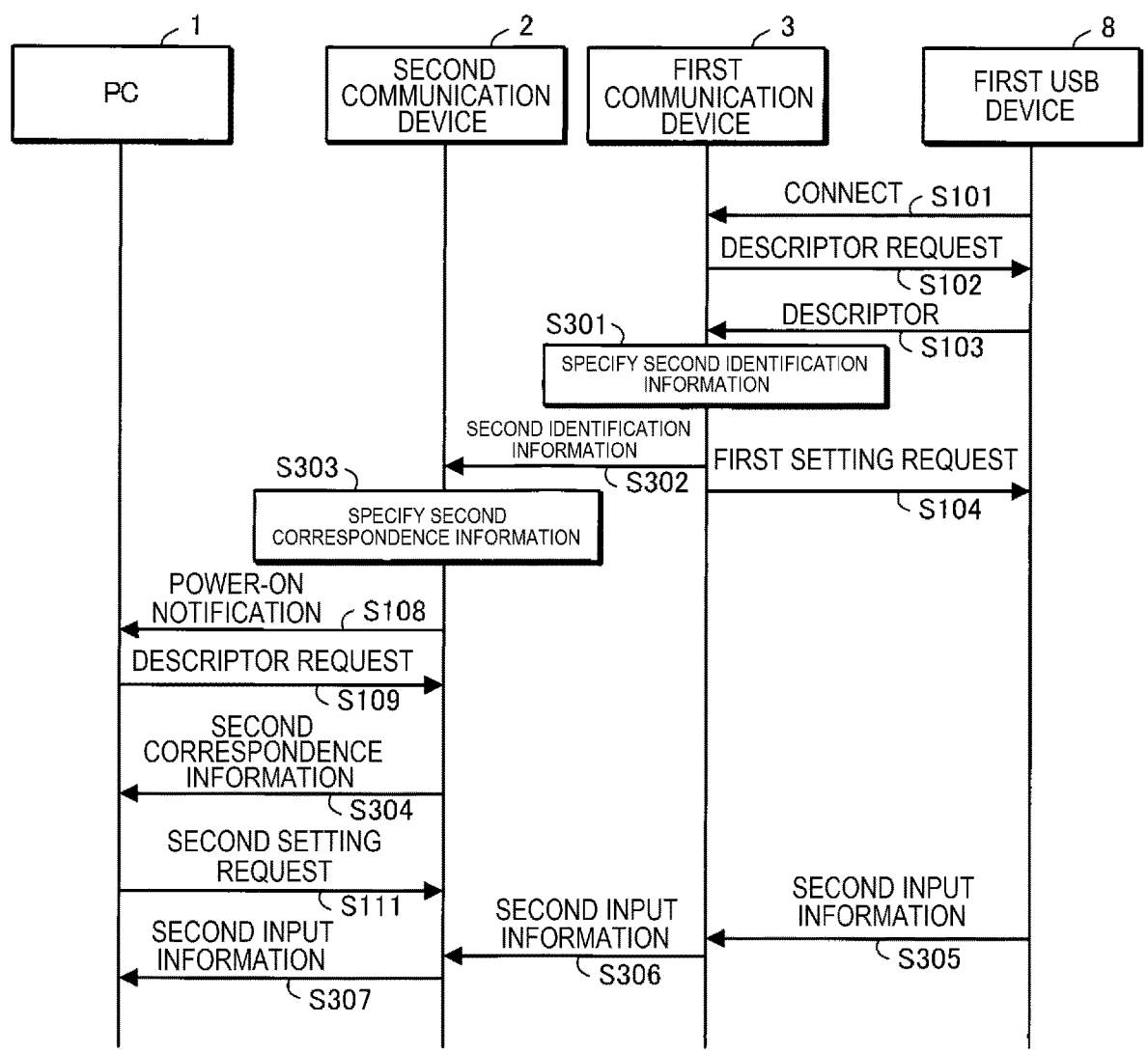

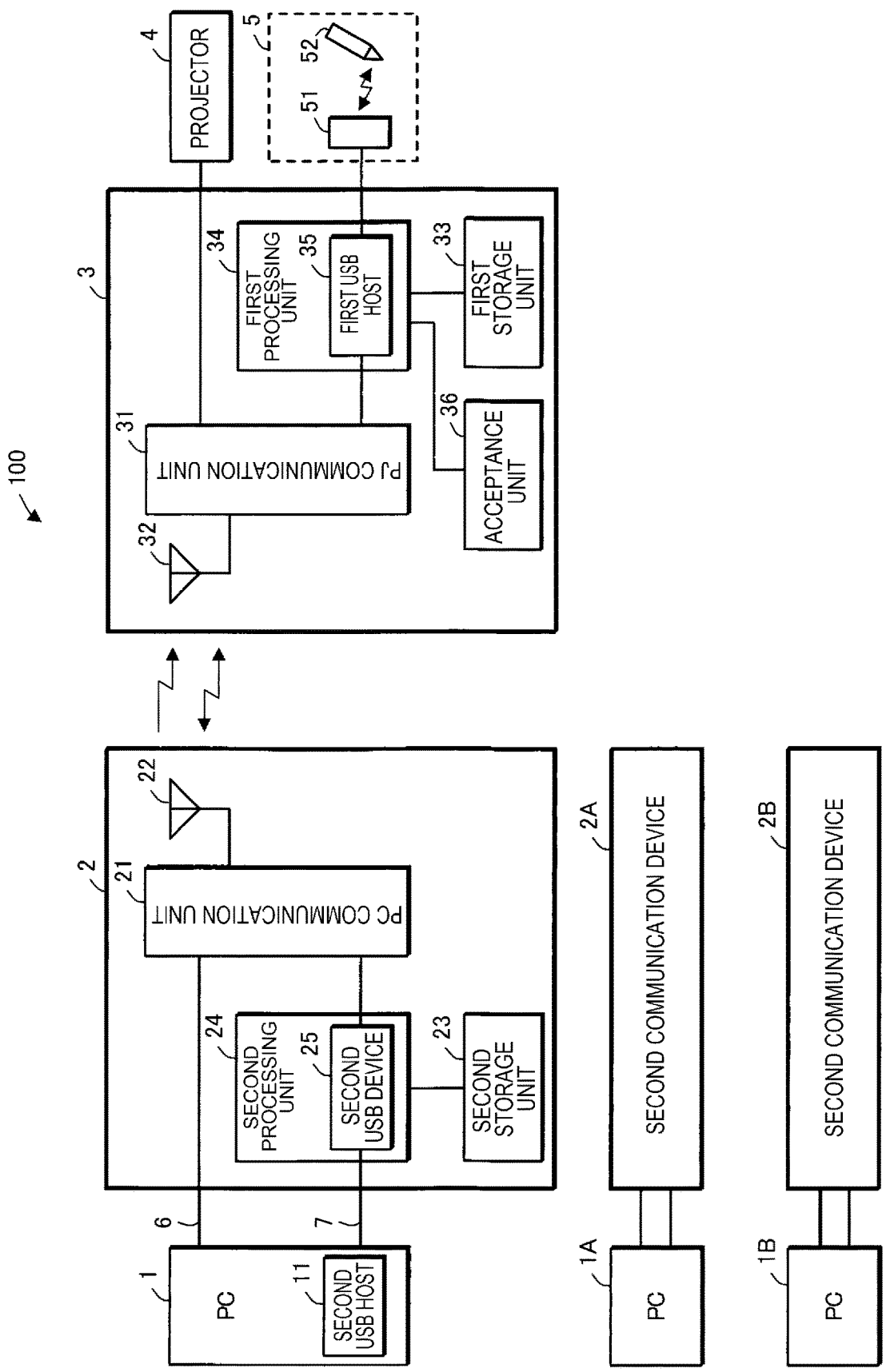

COMMUNICATION SYSTEM, COMMUNICATION DEVICE, AND COMMUNICATION METHOD FOR CONTROLLING INFORMATION TRANSFER WHEN CONNECTING AN INPUT DEVICE

CROSS-REFERENCE

The entire disclosure of Japanese Patent Application No. 2018-045225, filed Mar. 13, 2018 is expressly incorporated by reference herein.

BACKGROUND

1. Technical Field

The present invention relates to a communication system, a communication device, and a communication method.

2. Related Art

JP-A-2006-258833 discloses a system including a liquid crystal projector and a PC (personal computer). In this system, the liquid crystal projector transmits information received from a remote control device (remote controller) to the PC.

In a system such as the one disclosed in JP-A-2006-258833, when a first device such as a projector and a processing device such as a PC communicate with an input device such as a remote control device in conformity with a predetermined standard, the input device in some cases transmits information about an attribute of the input device in addition to input information representing an input content. In such cases, the first device transmits the information about the attribute of the input device received from the input device in addition to the input information received from the input device, to the processing device.

However, if the amount of data that can be transmitted per unit time to the processing device is limited, it may be difficult for the first device to transmit the information about the attribute of the input device in addition to the input information, to the processing device. Therefore, the situation where the processing device cannot receive the input information and the information about the attribute of the input device tends to occur readily.

SUMMARY

A communication system according to an aspect of the invention includes a first communication device and a second communication device which communicates with the first communication device. The first communication device includes: a first communication unit which receives, from a first input device, first input information and first information about an attribute of the first input device; and a second communication unit which does not transmit the first information received by the first communication unit to the second communication device but transmits the first input information received by the first communication unit to the second communication device. The second communication device includes: a storage unit which stores second information about an attribute of the first input device; a third communication unit which receives the first input information from the first communication device; and a control unit which outputs the second information stored in the storage unit and the first input information received by the third communication unit to a processing device.

In this configuration, even if the first communication device does not transmit the first information about the first input device received from the first input device, the first communication device transmits the first input information received from the first input device to the second communication device and therefore the processing device can receive the first input information and the second information about the attribute of the first input device from the second communication device.

Thus, even if the first communication device does not transmit the first information due to the limitation on the amount of data that can be transmitted per unit time to the processing device, the processing device can receive the first input information and the second information.

In the communication system, it is desirable that the second information is the same information as the first information.

This configuration enables the processing device to receive the second information that is the same information as the first information, even if the first communication device cannot transmit the first information.

In the communication system, it is desirable that the first input device is a first USB device, that the control unit is a second USB device, that the processing device is a USB host, and that the first information and the second information include a descriptor of the first USB device.

In this configuration, the second USB device outputs the descriptor of the first USB device to the USB host. Therefore, the second USB device is configured similarly to the first USB device. Thus, the second USB device, instead of the first USB device, can output the first input information of the first USB device received via the first communication device, to the USB host.

In the communication system, it is desirable that the USB host establishes communication with the second USB device, using the second information received from the second USB device, and that the second USB device, after having communication established with the USB host, outputs the first input information to the USB host via the established communication.

This configuration enables the second USB device to establish communication with the USB host and then output the first input information to the USB host via the communication.

In the communication system, it is desirable that the first communication unit receives, from a second input device, second input information and third information about an attribute of the second input device, that the second communication unit does not transmit the third information received by the first communication unit to the second communication device but transmits the second input information received by the first communication unit to the second communication device, and transmits first identification information which identifies the first information to the second communication device if the first communication unit receives the first information, and transmits second identification information which identifies the third information to the second communication device if the first communication unit receives the third information, that the first identification information has a smaller amount of data than the first information, that the second identification information has a smaller amount of data than the third information, that the storage unit stores fourth information about an attribute of the second input device, that the third communication unit receives the second input information, the first identification information, and the second identification information from the first communication device, and that the control unit outputs the second information stored in the storage unit to the processing device if the third communication unit receives the first identification information, and outputs the first input information to the processing device if the third communication unit receives the first input information, and outputs the fourth information stored in the storage unit to the processing device if the third communication unit receives the second identification information, and outputs the second input information to the processing device if the third communication unit receives the second input information.

This configuration makes it possible to change the information about the attribute outputted to the processing device, according to the information about the attribute of the input device received by the first communication unit.

In the communication system, it is desirable that the second communication device is one of a plurality of second communication devices, that the communication system includes an acceptance unit which accepts a selection operation to select a destination of the first input information from among the plurality of second communication devices, that the second communication unit transmits the first input information to the second communication device selected as the destination by the selection operation, and that the control unit maintains communication established with the processing device even if the second communication device including the control unit is no longer the destination in the state where the communication with the processing device is established.

This configuration makes it possible to change the destination of the input information while maintaining the communication established between the second communication device and the processing device. Thus, the destination of the input information can be changed more smoothly than in the case where the communication between the second communication device and the processing device is disconnected and reestablished every time the destination of the input information is changed.

A communication device according to another aspect of the invention includes: a first communication unit which receives, from a first input device, first input information and first information about an attribute of the first input device; and a second communication unit which does not transmit the first information received by the first communication unit to a first external communication device storing second information about an attribute of the first input device but transmits the first input information received by the first communication unit to the first external communication device, and thus causes the first external communication device to execute an operation of outputting the second information and the first input information to a processing device.

In this configuration, even if the communication device cannot transmit the first information about the attribute of the first input device due to the limitation on the amount of data that can be transmitted per unit time from the communication device to the processing device, the processing device can receive the first input information and the second information about the attribute of the first input device from the first external communication device.

A communication device according to still another aspect of the invention includes: a communication unit which receives first input information from a second external communication device that receives, from a first input device, the first input information and first information about an attribute of the first input device and that does not transmit the first information but transmits the first input information; a storage unit which stores second information about an attribute of the first input device; and a control unit which outputs the second information stored in the storage unit and the first input information received by the communication unit to a processing device.

In this configuration, even if the second external communication device cannot transmit the first information about the attribute of the first input device due to the limitation on the amount of data that can be transmitted per unit time from the second external communication device to the processing device, the processing device can receive the first input information and the second information about the attribute of the first input device from the communication device.

A communication method according to still another aspect of the invention includes: causing a first communication device to receive, from a first input device, first input information and first information about an attribute of the first input device; causing the first communication device not to transmit the first information to a second communication device storing second information about an attribute of the first input device and to transmit the first input information to the second communication device; causing the second communication device to receive the first input information from the first communication device; and causing the second communication device to output the second information and the first input information to a processing device.

In this configuration, even if the first communication device does not transmit the first information about the first input device received from the first input device, the first communication device transmits the first input information received from the first input device to the second communication device and therefore the processing device can receive the first input information and the second information about the attribute of the first input device from the second communication device.

Thus, even if the first communication device cannot transmit the first information due to the limitation on the amount of data that can be transmitted per unit time from the first communication device to the processing device, the processing device can receive the first input information and the second information.

BRIEF DESCRIPTION OF THE DRAWINGS

The invention will be described with reference to the accompanying drawings, wherein like numbers reference like elements.

FIG. 4 shows an example of a first DB 33a.

FIG. 5 shows an example of a second DB 23a.

FIG. 7 is a sequence chart for explaining an operation in the case where a third USB device 8 is connected to a first communication device 3.

FIG. 8 shows a communication system 100 according to a third embodiment.

DESCRIPTION OF EXEMPLARY EMBODIMENTS

Figure 1:
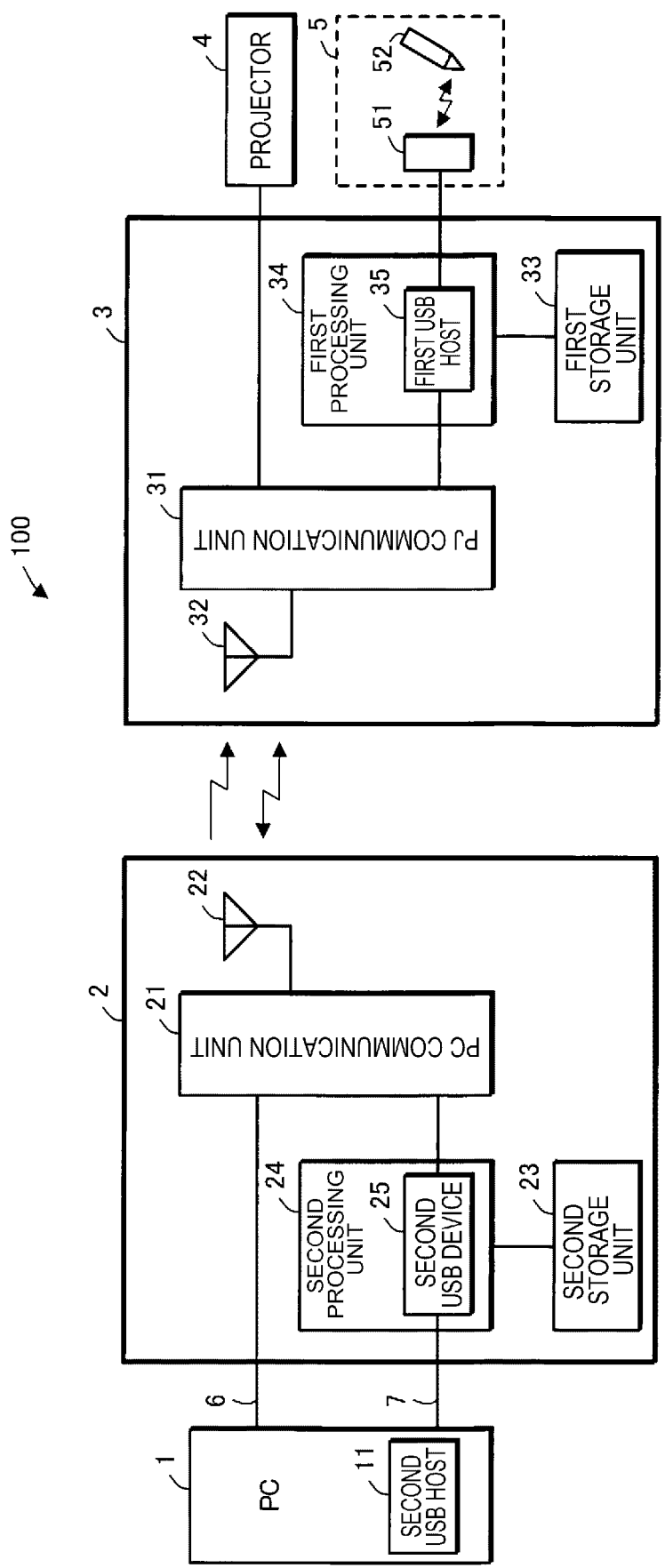
FIG. 1 shows a communication system 100 according to a first embodiment.

Hereinafter, embodiments will be described with reference to the drawings. In the drawings, the dimension and scale of each part are different from the actual dimension and scale according to need. The embodiments include various technically preferable limitations. However, the scope of the invention is not limited to these embodiments.

First Embodiment

FIG. 1 shows a communication system 100 according to a first embodiment.

The communication system 100 includes a PC 1, a second communication device 2, a first communication device 3, a projector 4, and a first USB (Universal Serial Bus) device 5. The PC 1, the projector 4, and the first USB device 5 may not be included in the communication system 100. In the communication system. 100, the PC 1 communicates with the first USB device 5 via the first communication device 3 and the second communication device 2.

The PC 1 transmits image information to the second communication device 2 via a HDMI (High-Definition Multimedia Interface) (trademark registered) cable 6. The PC 1 includes a second USB host 11. The second USB host 11 is an example of a processing device. The second USB host 11 communicates in conformity with the USB standard. The USB standard is an example of a predetermined standard.

The second communication device 2 is an example of a communication device and a first external communication device. The second communication device 2 includes a PC communication unit 21, a second antenna 22, a second storage unit 23, and a second processing unit 24.

The PC communication unit 21 is an example of a third communication unit. The PC communication unit 21 receives the image information from the PC 1 via the HDMI cable 6. The PC communication unit 21 transmits the image information received from the PC 1, in the form of a wireless signal on a HRP (high-rate physical layer) in the 60 GHz band from the second antenna 22 in conformity with the Wireless HD (trademark registered) standard.

The PC communication unit 21 receives information transmitted from the first communication device 3 in the form of a wireless signal on a LRP (low-rate physical layer) in the 60 GHz band in conformity with the Wireless HD standard. The information wirelessly transmitted from the first communication device 3 in conformity with the Wireless HD standard is input information outputted from the first USB device 5 (hereinafter also referred to as "first input information").

The LRP wireless signal can transmit a smaller amount of data per unit time than the HRP wireless signal. In other words, with the LRP wireless signal, the amount of data that can be transmitted per unit time is more limited than with the HRP wireless signal.

The second storage unit 23 is an example of a storage unit. The second storage unit 23 is a computer-readable recording medium. The second storage unit 23 is, for example, a flash memory. The second storage unit 23 stores a program that prescribes operations of the second communication device 2. The second storage unit 23 also stores the same information as the descriptor of the first USB device 5 (hereinafter also referred to as "first correspondence information"). The descriptor of the first USB device 5 is an example of first information about an attribute of the first USB device 5. The first correspondence information is an example of second information about an attribute of the first USB device 5.

The second processing unit 24 is a computer such as a CPU (central processing unit). The second processing unit 24 may be made up of one or a plurality of processors. The second processing unit 24 reads and executes a program stored in the second storage unit 23 and thus implements a second USB device 25.

The second USB device 25 is an example of a control unit. The second USB device 25 communicates in conformity with the USB standard. The second USB device 25 receives the first input information via the PC communication unit 21. The second USB device 25 outputs the first correspondence information stored in the second storage unit 23 to the second USB host via a USB cable 7. The second USB host 11 executes configuration for the second USB device 25, using the first correspondence information. After the configuration is finished, the second USB device 25 outputs the first correspondence information to the second USB host 11.

The first communication device 3 is an example of a communication device and a second external communication device. The first communication device 3 includes a projector (PJ) communication unit 31, a first antenna 32, a first storage unit 33, and a first processing unit 34.

The PJ communication unit 31 is an example of a second communication unit. The PJ communication unit 31 receives the image information wirelessly transmitted from the second communication device 2 in conformity with the Wireless HD standard, via the first antenna 32. The PJ communication unit 31 outputs the image information to the projector 4. The projector 4 projects and displays an image corresponding to the image information.

The PJ communication unit 31 also receives the first input information transmitted from the first USB device 5, via the first processing unit 34. The PJ communication unit 31 transmits the first input information in the form of a wireless signal on an LRP in the 60 GHz band from the first antenna 32 to the second communication device 2 in conformity with the Wireless HD standard. The PJ communication unit 31 does not transmit the descriptor of the first USB device 5 transmitted from the first USB device 5, to the second communication device 2.

The first storage unit 33 is a computer-readable recording medium. The first storage unit 33 is, for example, a flash memory. The first storage unit 33 stores a program that prescribes operations of the first communication device 3.

The first processing unit 34 is a computer such as a CPU. The first processing unit 34 may be made up of one or a plurality of processors. The first processing unit 34 reads and executes a program stored in the first storage unit 33 and thus implements a first USB host 35.

The first USB host 35 is an example of a first communication unit. The first USB host 35 communicates in conformity with the USB standard. The first USB host 35 communicates with the first USB device 5. The first USB device 5 is a digitizer including a USB communication unit 51 and a pen 52. The USB communication unit 51 and the pen 52 communicate with each other by short-range wireless communication such as Bluetooth (trademark registered). The first USB device 5 transmits coordinate information decided by the pen 52 as the first input information.

When the first USB device 5 is connected to the first USB host 35, the first USB host 35 transmits an instruction that requests the descriptor of the first USB device 5 (hereinafter referred to as a "descriptor request"), to the first USB device 5.

In response to the descriptor request, the first USB device 5 transmits the descriptor of the first USB device 5. The first USB host 35 receives the descriptor of the first USB device 5 from the first USB device 5. The first USB host 35 executes configuration for the first USB device 5, using the descriptor of the first USB device 5. After the configuration is finished, the first USB device 5 outputs the first input information to the first USB host 35. The first USB host 35 receives the first input information from the first USB device 5.

The first USB host 35 does not transmit the descriptor of the first USB device 5 to the PJ communication unit 31 but transmits the first input information to the PJ communication unit 31.

The projector 4 is an example of a display device. The projector 4 projects and displays an image corresponding to the image information onto a projection surface.

The first USB device 5 is an example of a first input device. The first USB device 5 is a USB device of the HID (Human Interface Device) class.

Next, operations will be described.

First, an operation in which the projector 4 projects and displays an image corresponding to image information transmitted from the PC 1 will be described.

When the PC 1 transmits image information to the PC communication unit 21 via the HDMI cable 6, the PC communication unit 21 receives the image information. The PC communication unit 21 transmits the image information received from the PC 1, in the form of a wireless signal on a HRP in the 60 GHz band from the second antenna 22 in conformity with the Wireless HD standard.

The PJ communication unit 31 receives the image information transmitted in the form of a wireless signal on a HRP in the 60 GHz band, via the first antenna 32. The PJ communication unit 31 outputs the image information received via the first antenna 32 to the projector 4. The projector 4 projects and displays an image corresponding to the image information received from the PJ communication unit 31.

Figure 2:
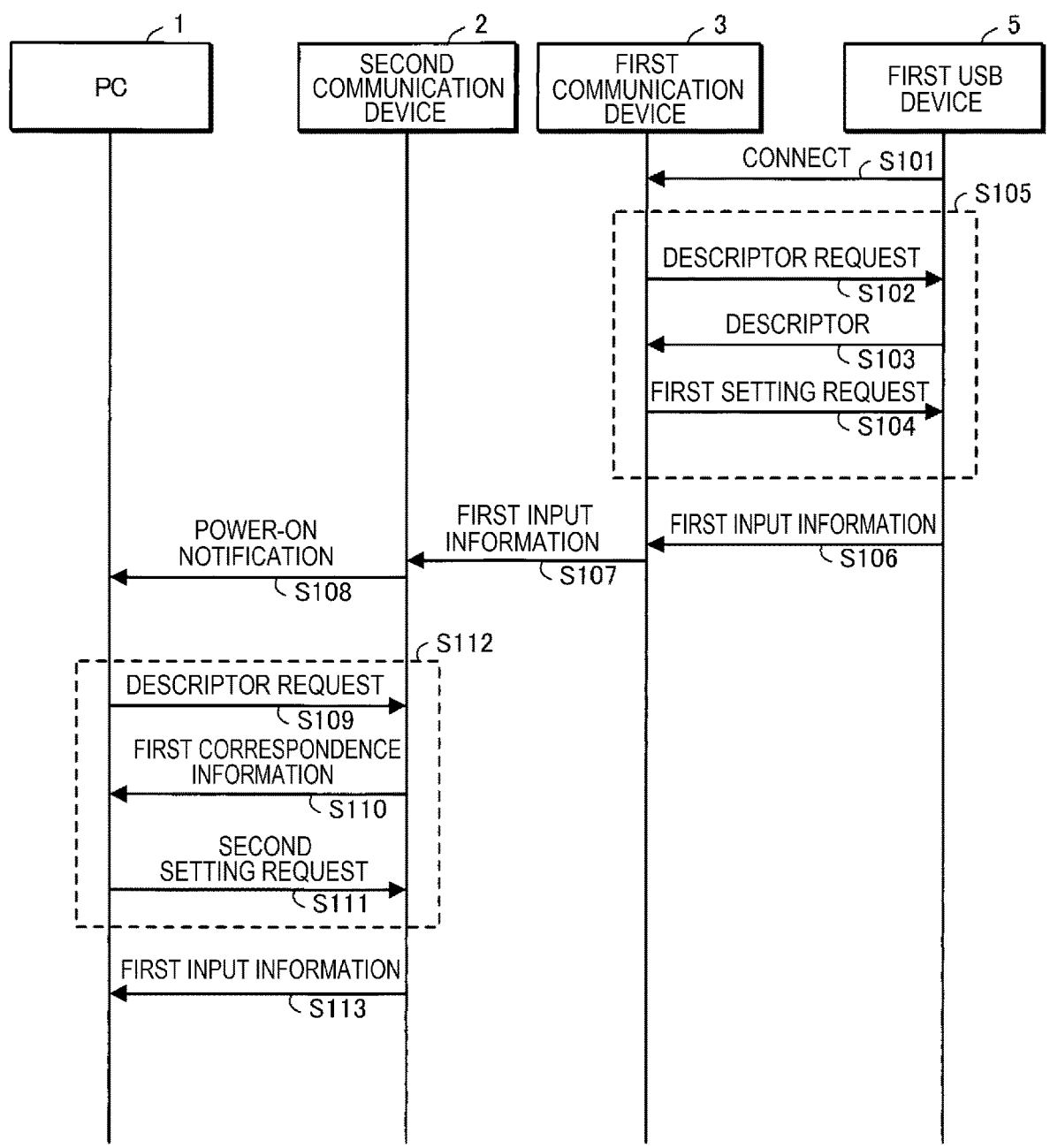
FIG. 2 is a sequence chart for explaining a connecting operation in the first embodiment.

Next, an operation in the case where the first USB device 5 is connected to the first communication device 3 (hereinafter also referred to as a "connecting operation") will be described. FIG. 2 is a sequence chart for explaining the connecting operation.

The USB communication unit 51 of the first USB device 5 is physically connected to the first USB host 35 (step S101). The first USB host 35 then transmits a descriptor request to the first USB device 5 (step S102).

On receiving the descriptor request, the first USB device 5 transmits the descriptor of the first USB device 5 to the first USB host 35 (step S103).

The first USB host 35 decides a setting for communication with the first USB device 5, using the descriptor of the first USB device 5. The first USB host 35 then transmits a request to execute the decided setting (hereinafter also referred to as a "first setting request") to the first USB device 5 (step S104). The first USB device 5 executes the setting for communication according to the first setting request.

This completes the configuration from step S102 to step S104 (step S105). The operation from step S101 to step S104 is also referred to as "plug and play".

In FIG. 2, each step S102, step S103, and step S104 is shown only once in order to simplify the explanation. However, since the descriptor of the first USB device 5 includes a device descriptor, a configuration descriptor, an interface descriptor, and an endpoint descriptor or the like, step S102, step S103, and step S104 may be executed for each descriptor.

On completion of the configuration for the first USB device 5, the first USB device 5 transmits first input information to the first USB host 35 (step S106). The first USB device 5 transmits the first input information with a packet header to the first USB host 35.

On receiving the first input information with the packet header, the first USB host 35 removes the packet header from the first input information. The first USB host 35 then outputs the first input information from which the packet header has been removed, to the PJ communication unit 31.

On receiving the first input information from the first USB host 35, the PJ communication unit 31 transmits the first input information in the form of a wireless signal on a LRP in the 60 GHz band from the first antenna 32 in conformity with the Wireless HD standard (step S107). That is, the PJ communication unit 31 does not transmit the descriptor of the first USB device 5 to the second communication device 2 but transmits the first input information to the second communication device 2. In this embodiment, the PJ communication unit 31 puts the first input information on a LRP response signal periodically issued in conformity with the Wireless HD standard and thus transmits the first input information to the second communication device 2.

On receiving the first input information transmitted from the first communication device 3, the PC communication unit 21 outputs the first input information to the second USB device 25. On receiving the first input information, the second USB device 25 notifies the second USB host 11 that the second USB device 25 is now in a power-on state (step S108).

The second USB host 11 detects the power-on of the second USB device 25, based on the notification from the second USB device 25, and then transmits a descriptor request to the second USB device 25 (step S109).

On receiving the descriptor request, the second USB device 25 outputs first correspondence information stored in the second storage unit 23 to the second USB host 11 (step S110).

The second USB host 11 decides a setting for communication with the second USB device 25, using the first correspondence information received from the second USB device 25.

Next, the second USB host 11 transmits a request to execute the decided setting (hereinafter also referred to as a "second setting request") to the second USB device 25 (step S111). The second USB device 25 executes the setting for communication according to the second setting request.

This completes the configuration from step S109 to step S111 (step S112). The completion of this configuration means that communication between the second USB host 11 and the second USB device 25 has been established. The operation from step S108 to step S111 is an operation equivalent to the so-called "plug and play".

The configuration for the second USB device 25 is executed, using the same information as the descriptor of the first USB device 5. Therefore, the second USB host 11 recognizes the second USB device 25 as the first USB device 5.

After the configuration is finished, that is, after the communication between the second USB device 25 and the second USB host 11 is established, the second USB device 25 transmits the first input information of the first USB device 5 to the second USB host 11 (step S113). When the second USB host 11 receives the first input information, the PC 1 operates, based on the first input operation received by the second USB host 11. That is, the PC 1 operates, based on the first input information outputted from the first USB device 5.

The timing to start step S108 may be decided according to the timing when the second USB host 11 and the second USB device 25 are connected to each other via the USB cable 7, instead of the timing when the second communication device 2 receives the first input information.

In the communication system 100 and the communication method according to this embodiment, even if the first communication device 3 does not transmit the descriptor of the first USB device 5 received from the first USB device 5, the second USB host 11 can receive the first input information and the first correspondence information about the attribute of the first USB device 5 from the second communication device 2.

That is, according to this embodiment, even if the amount of data is reduced by omitting the transmission of the descriptor of the first USB device 5, the second USB host 11 can receive the first input information and the first correspondence information about the attribute of the first USB device 5.

Thus, even if communication where the amount of data that can be transmitted per unit time is more limited than with a wireless signal on a HRP, such as communication with a wireless signal on a LRP in the 60 GHz band conforming to the Wireless HD standard, is used, the second USB host 11 can be provided with the first input information and the first correspondence information about the attribute of the first USB device 5. Also, since there is no need to set an additional wireless transmission path to enable wireless transmission of all the signals transmitted from the first USB device 5, a simply wireless interactive device can be constructed.

Second Embodiment

In a second embodiment, the correspondence information transmitted from the second communication device 2 to the PC is changed according to the USB device installed in the first communication device 3.

The second communication device 2 stores the same information as the descriptor of each of a plurality of USB devices. As an example of the plurality of USB devices, a USB device having a descriptor of the digitizer class, where multi-touch is enabled and a USB having a descriptor of the mouse class, where multi-touch is disabled, may be employed.

The first communication device 3 transmits identification information which identifies the descriptor of the USB device connected to the first communication device 3, to the second communication device 2. The second USB device 25 of the second communication device 2 outputs the descriptor corresponding to the identification information received from the first communication device 3, to the second USB host 11. The second USB host 11 configures the second USB device 25, using the descriptor received from the second USB device 25.

The configuration for the second USB device 25 is executed, using the same information as the descriptor of the USB device connected to the first communication device 3. Therefore, the second USB host 11 recognizes the second USB device 25 as the USB device connected to the first communication device 3.

Figure 3:
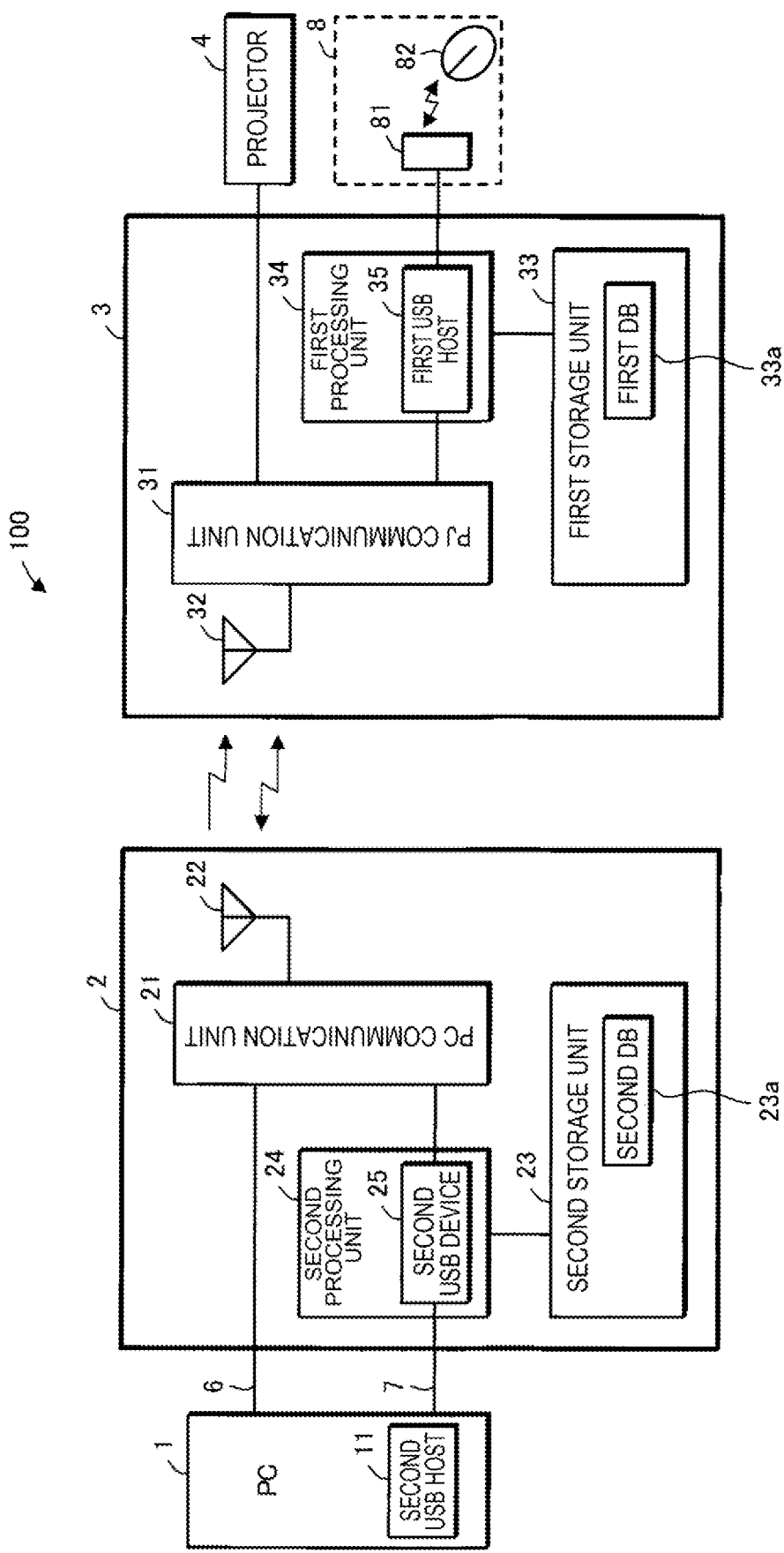
FIG. 3 shows a communication system 100 according to a second embodiment.

FIG. 3 shows a communication system 100 according to the second embodiment. In FIG. 3, the same components as those shown in FIG. 1 are denoted by the same reference numbers. The communication system 100 according to the second embodiment will be described below, mainly in terms of differences from the configuration shown in FIG. 1.

In the communication system 100 according to the second embodiment, the first USB host 35 is connected to the first USB device 5 or the third USB device 8.

The third USB device 8 is an example of a second input device. The third USB device 8 includes a USB communication unit 81 and a mouse 82. The USB communication unit 81 and the mouse 82 communicate with each other by short-range wireless communication such as Bluetooth (trademark registered). The third USB device 8 outputs click information or the like transmitted from the mouse 82, as second input information. The third USB device 8 also outputs the descriptor of the third USB device 8. The descriptor of the third USB device 8 is an example of third information about an attribute of the third USB device 8.

When the first USB host 35 is connected to the third USB device 8, the first USB host 35 receives the second input information and the descriptor of the third USB device 8 from the third USB device 8.

When the first USB host 35 is connected to the first USB device 5, the first USB host 35 receives the first input information and the descriptor of the first USB device 5 from the first USB device 5.

The PJ communication unit 31 transmits the second input information received by the first USB host 35 to the second communication device 2. The PJ communication unit 31 transmits the first input information received by the first USB host 35 to the second communication device 2.

The first storage unit 33 also stores a first DB (database) 33a. FIG. 4 shows an example of the first DB 33a.

The first DB 33a stores the descriptor "AAA" of the first USB device 5 and the identification (hereinafter also referred to as "first identification information") "A" of the descriptor of the first USB device 5, in association with each other. The first identification information has a smaller amount of data than the descriptor of the first USB device 5.

The first DB 33a stores the descriptor "BBB" of the third USB device 8 and the identification (hereinafter also referred to as "second identification information") "B" of the descriptor of the third USB device 8, in association with each other. The second identification information has a smaller amount of data than the descriptor of the third USB device 8.

On receiving the descriptor of the first USB device 5, the first USB host 35 reads the first identification information corresponding to the descriptor of the first USB device 5, referring to the first DB 33a. The PJ communication unit 31 transmits the first identification information read by the first USB host 35 to the second communication device 2. That is, when the first USB host 35 receives the descriptor of the first USB device 5, the PJ communication unit 31 does not transmit the descriptor of the first USB device 5 received by the first USB host 35 to the second communication device 2 but transmits the first identification information to the second communication device 2.

On receiving the descriptor of the third USB device 8, the first USB host 35 reads the second identification information corresponding to the descriptor of the third USB device 8, referring to the first DB 33a. The PJ communication unit 31 transmits the second identification information read by the first USB host 35 to the second communication device 2. That is, when the first USB host 35 receives the descriptor of the third USB device 8, the PJ communication unit 31 does not transmit the descriptor of the third USB device 8 received by the first USB host 35 to the second communication device 2 but transmits the second identification information to the second communication device 2.

The second storage unit 23 also has a second DB 23a. FIG. 5 shows an example of the second DB 23a. The second DB 23a shown in FIG. 5 has the same configuration as the first DB 33a shown in FIG. 4.

The descriptor of the first USB device 5 stored in the second DB 23a is first correspondence information and is an example of second information.

The descriptor of the third USB device 8 stored in the second DB 23a (hereinafter also referred to as "second correspondence information") is an example of fourth information.

The PC communication unit 21 also receives the second input information, the first identification information, and the second identification information from the first communication device 3.

When the PC communication unit 21 receives the first identification information, the second USB device 25 reads the descriptor of the first USB device 5 corresponding to the first identification information, that is, the first correspondence information, referring to the second DB 23a. The second USB device 25 then outputs the first correspondence information to the second USB host 11.

When the PC communication unit 21 receives the first input information, the second USB device 25 outputs the first input information to the second USB host 11.

When the PC communication unit 21 receives the second identification information, the second USB device 25 reads the descriptor of the third USB device 8 corresponding to the second identification information, that is, the second correspondence information, referring to the second DB 23a. The second USB device 25 then outputs the second correspondence information to the second USB host 11.

When the PC communication unit 21 receives the second input information, the second USB device 25 outputs the second input information to the second USB host 11.

Next, operations will be described.

Figure 6:
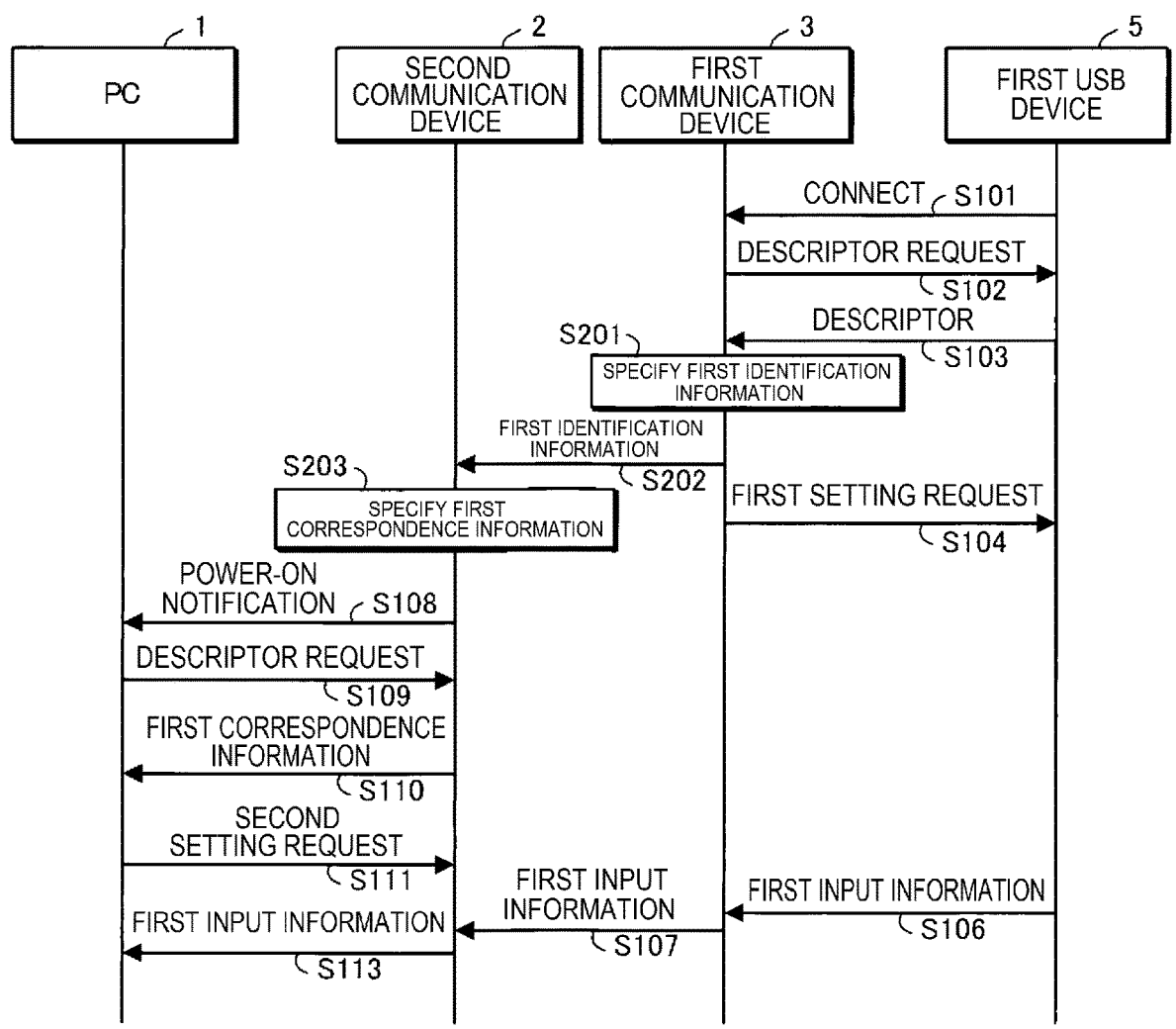
FIG. 6 is a sequence chart for explaining a connecting operation in the second embodiment.

FIG. 6 is a sequence chart for explaining an operation in the case where the first USB device 5 is connected to the first communication device 3. In FIG. 6, the same processes as those shown in FIG. 2 are denoted by the same reference numbers. Of the processing shown in FIG. 6, different processes from those shown in FIG. 2 will be mainly described.

When the first USB host 35 receives the descriptor of the first USB device 5, the first USB host 35 specifies first identification information corresponding to the descriptor of the first USB device 5, referring to the first DB 33a (step S201).

Next, the first USB host 35 reads out the first identification information from the first DB 33a. The first USB host 35 then outputs the first identification information to the PJ communication unit 31. The PJ communication unit 31 transmits the first identification information received from the first USB host 35, in the form of a wireless signal on a LRP in the 60 GHz band from the first antenna 32 in conformity with the Wireless HD standard (step S202).

On receiving the first identification information transmitted from the first communication device 3, the PC communication unit 21 outputs the first identification information to the second USB device 25. On receiving the first identification information, the second USB device 25 specifies first correspondence information corresponding to the first identification information, referring to the second DB 23a (step S203). The second USB device 25 then executes step S108.

FIG. 7 is a sequence chart for explaining an operation in the case where the third USB device 8 is connected to the first communication device 3. In FIG. 7, the same processes as those shown in FIG. 6 are denoted by the same reference numbers. Of the processing shown in FIG. 7, different processes from those shown in FIG. 6 will be mainly described.

When the first USB host 35 receives the descriptor of the third USB device 8, the first USB host 35 specifies second identification information corresponding to the descriptor of the third USB device 8, referring to the first DB 33a (step S301).

Next, the first USB host 35 reads out the second identification information from the first DB 33a. The first USB host 35 then outputs the second identification information to the PJ communication unit 31. The PJ communication unit 31 transmits the second identification information received from the first USB host 35, in the form of a wireless signal on a LRP in the 60 GHz band from the first antenna 32 in conformity with the Wireless HD standard (step S302).

On receiving the second identification information transmitted from the first communication device 3, the PC communication unit 21 outputs the second identification information to the second USB device 25. On receiving the second identification information, the second USB device 25 specifies second correspondence information corresponding to the second identification information, referring to the second DB 23a (step S303). The second USB device 25 then executes step S108.

When the second USB device 25 subsequently receives a descriptor request, the second USB device 25 outputs the second correspondence information to the second USB host 11 (step S304).

The second input information outputted from the third USB device 8 is transmitted to the first communication device 3 (step S305), then transmitted to the second communication device 2 (step S306), and subsequently transmitted to the second USB host 11 of the PC 1 (step S307).

According to this embodiment, the descriptor outputted to the second USB host 11 of the PC 1 can be changed in accordance with the descriptor of the USB device received by the first USB host 35.

Therefore, it is possible to easily cope with the case where a USB device of a different device class is installed on the first communication device 3.

Even if the descriptor of the first USB device 5 is not supported by the OS (operating system) of the PC 1, it is possible to cope with the difference of the OS of the PC 1 by using a descriptor supported by the OS of the PC 1 as the first correspondence information of the descriptor of the first USB device 5. Also, it is possible to easily cope with variation of the source device by changing the correspondence information in accordance with the source device such as PC.

In this embodiment, the identification information is transmitted. The identification information has a smaller amount of data than the descriptor. Therefore, the amount of data transmitted can be made smaller than in a configuration where the descriptor is transmitted.

Third Embodiment

In a third embodiment, a plurality of sets of the PC 1 and the second communication device 2 exist.

The first communication device 3 accepts a selection operation to select a destination of the first input information of the first USB device 5 from among the plurality of second communication devices 2. The first communication device 3 transmits the first input information of the first USB device 5 to the second communication device 2 selected as the destination by the selection operation.

The second communication device 2 maintains the communication established with the second USB host 11 even if the second communication device 2 is no longer the destination in the state where the communication with the second USB host 11 is established. The state where the communication with the second USB host 11 is established means the state where the configuration for the second USB device 25 is completed by the second USB host 11.

FIG. 8 shows a communication system 100 according to the third embodiment. In FIG. 8, the same components as those shown in FIG. 1 are denoted by the same reference numbers. The communication system 100 according to the third embodiment will be described below, mainly in terms of differences from the configuration shown in FIG. 1.

The communication system 100 according to the third embodiment further includes a set of a second communication device 2A and a PC 1A, and a set of a second communication device 2B and a PC 1B. The second communication devices 2A and 2B have the same configuration as the second communication device 2. The PCs 1A and 1B have the same configuration as the PC 1.

It is assumed that the second USB host 11 has completed the configuration for the second USB device 25 in each of the set of the second communication device 2 and the PC1, the set of the second communication device 2A and the PC 1A, and the set of the second communication device 2B and the PC 1B. That is, the communication between the second USB host 11 and the second USB device 25 has been established in each of the set of the second communication device 2 and the PC 1, the set of the second communication device 2A and the PC 1A, and the set of the second communication device 2B and the PC 1B.

The first communication device 3 includes an acceptance unit 36. The acceptance unit 36 is, for example, a selection switch. The acceptance unit 36 accepts a selection operation to select the destination of the first input information of the first USB device 5 from among the second communication devices 2, 2A, and 2B.

The acceptance unit 36 may be provided in one of the second communication devices 2, 2A, and 2B, instead of the first communication device 3. In this case, destination information representing the destination specified by the selection operation accepted by the acceptance unit 36 is transmitted to the first communication device 3.

When the acceptance unit 36 accepts a selection operation, the first USB host 35 causes the PJ communication unit 31 to execute an operation to change the destination of the first input information to the destination selected by the selection operation. Meanwhile, when the PJ communication unit 31 receives destination information, the first USB host 35 causes the PJ communication unit 31 to execute an operation to change the destination of the first input information to the destination specified by the destination information.

The second USB device 25 of each of the second communication devices 2, 2A, and 2B maintains the communication established with the second USB host 11, even if the second communication device including the second USB device 25 is no longer the destination in the state where the communication with the second USB host 11 is established. Hereinafter, the mode where the second communication that is no longer the destination maintains the communication established with the second USB host 11 is referred to as a "hold mode".

For example, in FIG. 8, if the destination is changed from the second communication device 2 to the second communication device 2A, the second communication device 2 shifts into the hold mode.

The second USB host 11 having the communication established with the second USB device 25 of the second communication device in the hold mode continues recognizing this second USB device 25 as the USB device of the HID class.

The first communication device 3 does not transmit the first input information to the second communication device in the hold mode but transmits the first input information to the second communication device selected as the destination. Therefore, the first input information is not transmitted to the second communication device in the hold mode and the second USB host 11 having the communication established with the second communication device in the hold mode.

If the second communication device in the hold mode is later selected as the destination, this second communication device cancels the hold mode. For example, if the second communication device that has been in the hold mode is selected as the destination, the second communication device cancels the hold mode.

In this case, the second communication device that has become the destination maintains the communication established with the PC. Therefore, there is no need to execute configuration for the second USB device 25 of the second communication device that has become the destination. Thus, the second USB host 11 communicating with the second communication device that has become the destination can receive the first input information without having to execute configuration such as reinstalling a device driver.

According to this embodiment, the destination of the first input information can be changed more smoothly than in the case where the communication between the second USB host and the second USB device 25 is disconnected and reestablished every time the destination of the first input information is changed.

Therefore, in the case of dynamically switching the PC communicating with the first communication device 3 among a plurality of PCs, for example, in a conference using a plurality of PCs or in a presentation using a plurality of PCs, it is possible to smoothly switch between the PCs.

Modifications

The invention is not limited to the above embodiments. For example, various modifications as described below can be made. Also, one or a plurality of modifications arbitrarily selected from the following modifications can be combined together according to need.

Modification 1

While the same information as the descriptor of the first USB device 5 is used as the first correspondence information, the first correspondence information is not limited to the same information as the descriptor of the first USB device 5. For example, a subset of the descriptor of the first USB device 5 may be used as the first correspondence information.

Similarly, the second correspondence information is not limited to the same information as the descriptor of the third USB device 8. For example, a subset of the descriptor of the third USB device 8 may be used as the second correspondence information.

Modification 2

The first communication device 3 may be an independent device or may be built in another device. For example, the first communication device 3 may be built in a display device such as the projector 4.

If the first communication device 3 is built in the projector 4, the first USB device 5 is connected to the projector 4 having the built-in first communication device 3.

The second communication device 2 may be an independent device or may be built in another device. For example, the second communication device 2 may be built in a device which outputs image information such as the PC 1.

The first USB device 5 may be connected to the projector 4, and the first USB device 5 and the first USB host 35 may communicate with each other via the projector 4.

Modification 3

The first USB device 5 is not limited to the USB device including the USB communication unit 51 and the pen 52. For example, the first USB device 5 may be any USB device belonging to the HID class.

The third USB device 8 is not limited to the USB device including the USB communication unit 81 and the mouse 82. For example, the third USB device 8 may be any USB device belonging to the HID class.

Modification 4

In the second embodiment, the number of descriptors stored in the first DB 33*a* and the second DB 23*a* may be any number equal to or greater than 2.

Modification 5

In the third embodiment, a communication device having the same configuration as the first communication device in the second embodiment may be provided as the first communication device 3, and a communication device having the same configuration as the second communication device 2 in the second embodiment may be provided as each of the second communication devices 2, 2A, and 2B.

Modification 6

The communication between the first communication device 3 and the second communication device 2 is not limited to the communication based on the Wireless HD standard and can be changed according to need. For example, the communication between the first communication device 3 and the second communication device 2 may be communication in different transmission/reception bands on a general-purpose communication path such as Wi-Fi. Even in this case, the necessary band can be made narrower than in a system where all the signals transmitted from the first USB device 5 are transmitted. Thus, advantageous effects such as being able to easily synchronize the transmission of image information and the control of input information are achieved.

Modification 7

The cable for communicating image information is not limited to the HDMI cable 6 and can be changed according to need.

Modification 8

While the projector is used as the display device, the display device is not limited to the projector and can be changed according to need. For example, the display device may be a direct-view display. The direct-view display is, for example, a liquid crystal display, organic EL (electroluminescence) display, plasma display, or CRT (cathode ray tube) display.

Modification 9

All or apart of the elements implemented by at least one of the first processing unit 34 and the second processing unit 24 reading and executing a program may be implemented by hardware such as an electronic circuit like FPGA (field-programmable gate array) or ASIC (application-specific IC) or may be implemented by a collaboration between software and hardware.

What is claimed is:

1. A communication system comprising a first communication device and a second communication device which communicates with the first communication device, the first communication device comprising:
    a first communication unit which receives, from a first input device, first input information and a first descriptor about an attribute of the first input device;
    a first storage unit storing first identification information associated with the first descriptor, the first storage unit storing the first identification information and the first descriptor before the first communication unit receives the first input information and the first descriptor from the first input device; and
    a second communication unit which does not transmit the first descriptor received by the first communication unit to the second communication device but transmits the first input information received by the first communication unit and the first identification information to the second communication device,
the second communication device comprising:
    a second storage unit which stores a second descriptor about the attribute of the first input device in association with the first identification information of the first input device;
    a third communication unit which receives the first input information and the first identification information from the first communication device, wherein the second storage unit stores the second descriptor and the first identification information before the third communication unit receives the first input information and the first identification information from the first communication device; and
    a control unit which outputs the second descriptor stored in the second storage unit and the first input information received by the third communication unit to a processing device.

2. The communication system according to claim 1, wherein
    the second descriptor is the same descriptor as the first descriptor.

3. The communication system according to claim 1, wherein
    the first input device is a first USB device,
    the control unit is a second USB device,
    the processing device is a USB host, and
    the first descriptor and the second descriptor are a descriptor of the first USB device.

4. The communication system according to claim 3, wherein
    the USB host establishes communication with the second USB device, using the second descriptor received from the second USB device, and
    the second USB device, after having communication established with the USB host, outputs the first input information to the USB host via the established communication.

5. The communication system according to claim 1, wherein
    the first communication unit receives, from a second input device, second input information and a third descriptor about an attribute of the second input device,
    the second communication unit
        does not transmit the third descriptor received by the first communication unit to the second communication device but transmits the second input information received by the first communication unit to the second communication device,
        transmits the first identification information which identifies the first descriptor to the second communication device if the first communication unit receives the first descriptor, and transmits second identification information which identifies the third descriptor to the second communication device if the first communication unit receives the third descriptor, the first identification information has a smaller amount of data than the first descriptor, the second identification information has a smaller amount of data than the third descriptor, the second storage unit stores a fourth descriptor about an attribute of the second input device, the third communication unit receives the second input information, the first identification information, and the second identification information from the first communication device, and the control unit outputs the second descriptor stored in the second storage unit to the processing device if the third communication unit receives the first identification information, outputs the first input information to the processing device if the third communication unit receives the first input information, outputs the fourth descriptor stored in the second storage unit to the processing device if the third communication unit receives the second identification information, and outputs the second input information to the processing device if the third communication unit receives the second input information.

6. The communication system according to claim 1, wherein the second communication device is one of a plurality of second communication devices, the communication system includes an acceptance unit which accepts a selection operation to select a destination of the first input information from among the plurality of second communication devices, the second communication unit transmits the first input information to the second communication device selected as the destination by the selection operation, and the control unit maintains communication established with the processing device even if the second communication device including the control unit is no longer the destination in the state where the communication with the processing device is established.

7. A communication device comprising:

a first communication unit which receives, from a first input device, first input information and a first descriptor about an attribute of the first input device; and stores the first identification information associated with the first descriptor, the first communication unit having stored the first identification information and the first descriptor before the first communication unit receives the first input information and the first descriptor from the first input device; and a second communication unit which does not transmit the first descriptor received by the first communication unit to a first external communication device storing a second descriptor about the attribute of the first input device in association with the first identification information of the first input device, but transmits the first identification information and the first input information received by the first communication unit to the first external communication device, the first external communication device having stored the second descriptor and the first identification information before the first external communication device receives the first input information and the first identification information from the first communication device, and thus causes the first external communication device to execute an operation of outputting the second descriptor and the first input information to a processing device.

8. A communication method comprising:

causing a first communication device to receive, from a first input device, first input information and a first descriptor about an attribute of the first input device;

causing the first communication device to store first identification information associated with the first descriptor, the first communication device having stored the first identification information and the first descriptor before the first communication device receives the first input information and the first descriptor from the first input device;

causing the first communication device not to transmit the first descriptor to a second communication device storing a second descriptor about the attribute of the first input device in association with the first identification information of the first input device, and to transmit the first input information and the first identification information to the second communication device;

causing the second communication device to receive the first input information and the first identification information from the first communication device, the second communication device having stored the second descriptor and the first identification information before the second communication device receives the first input information and the first identification information from the first communication device; and causing the second communication device to output the second descriptor and the first input information to a processing device.

* * * * *